Patented Feb. 27, 1934

1,949,267

UNITED STATES PATENT OFFICE 1,949,267

PRODUCTION OF ESTERS OF ORGANIC ACIDS

James Raymond Buckley and Carrol Adron Doran, Parlin, N. J., assignors to E. I. du Pont de Nemours & Company, Wilmington, Del., a corporation of Delaware No Drawing. Application February 26, 1931
Serial No. 518,498

20 Claims. (Cl. 260—106)

This invention relates to the production of esters of organic acids and more particularly to the production of substantially water-white esters of acids of the lower fatty acid series from acids of commercial grades.

Organic esters have heretofore generally been prepared by continuous or intermittent introduction of a mixture of alcohol and organic acid into a fractionating still or kettle containing equal molecular proportions of the reactants or an excess of one of the reactants and a small amount of mineral acid, generally sulphuric acid, as a catalyst. The still is kept at approximately the boiling point of the mixture. Esterification takes place practically immediately and an azeotropic mixture of ester, water, and alcohol, or a binary of any of them, having a definite boiling point, ascends the fractionating column. This mixture is collected, the alcohol removed by scrubbing with water and the water-ester mixture again distilled and condensed. The water and ester separate in well defined layers; the top ester layer is removed, and, if desired, further treated with drying agents.

Commercial organic acids, particularly the synthetically made acids of the lower fatty acid series, frequently contain undetermined impurities, which can not be removed by distillation or other practical purification means. The presence of these impurities in the acids is usually indicated by a yellowish or greenish cast which they give to the acids although, in some cases, the acids may be colorless and yet contain these impurities. Regardless of whether the acids are discolored or not, esters made from the acids by the above outlined process are often discolored and contain the impurities.

The discoloration is objectionable as these esters are used to a large extent in lacquers and light-colored enamels where a water-white solvent is highly desirable, and called for in many manufacturers' specifications. Furthermore, the presence of these impurities is additionally objectionable in that they may be of acidic nature or, at least, may be readily oxidized to substances of an acidic nature and accordingly corrode the ordinary metal containers in which they are shipped and stored, this corrosion causing additional discoloration of the esters, as well as destruction of the container.

Heretofore no satisfactory method of removing these impurities either from the commercial acids or esters produced therefrom has been known. Generally it has been necessary to produce the esters from highly purified acids made from other sources as, for example, the calcium salts of the acids.

The object of the present invention is to provide a practical process for the manufacture of substantially water-white esters of organic acids, more particularly esters of the acids of the lower fatty acid series, and a further object is to provide a process for producing water-white esters in which synthetic acids of ordinary commercial grades can be used.

These objects are accomplished according to the present invention by subjecting the reaction mixture in which the esters are formed to the action of a reducing agent during the esterification, or by subjecting the organic acid to be used in the esterification to the action of a reducing agent before it is introduced into the reaction mixture, or by subjecting the ester subsequently to the esterification step to the action of a reducing agent.

In large scale production it is usually practical either to subject the organic acid during storage to the action of the reducing agent, or to subject the reaction mixture during the esterification to the action of the reducing agent, as, if the ester is treated after the esterification step, it will entail a further distillation or equivalent purification step to remove the reducing agent and obtain a product of the desired purity. However, the reducing agent is efficacious during all three stages and treatment of the acid before esterification, the reaction mixture during esterification, and the ester subsequent to esterification, all come within the scope of the present invention.

This process is preferably carried out by charging a still with either the alcohol or organic acid and a small quantity of a mineral acid as a catalyst and a suitable reducing agent such as finely divided iron, zinc, tin, etc. A suitable mixture of alcohol and organic acid, usually in stoichiometric proportions, is then introduced in a continuous or intermittent stream, depending upon whether a continuous process or batch process is to be used, into the still which is kept at approximately the boiling point of the reaction liquid, and the vapors of ester, alcohol and water are led off and treated as in the prior art process hereinabove described to separate the esters.

Alternatively the reducing agent and a small quantity of mineral acid can be added to the organic acid during storage, or the same can be added to the ester after its separation. In the last case, the ester ordinarily would have to be distilled again to separate it from the reducing agent.

This process is applicable to any esterification but is particularly advantageous in those reactions involving the use of one or more of the acids of the lower fatty acid series, such as formic, acetic, propionic, butyric, and valeric acids, and in "brown acid" produced as a by-product in the manufacture of acetic acid from acetate of lime and which consists mainly of the higher homologues of acetic acid such as propionic, butyric and valeric acids. These acids are most apt to contain the impurities which discolor the resulting esters. Acetic acid, in particular, when made synthetically almost invariably contains these impurities and removal of the impurities from this acid by redistillation, or any practical method of purification, can not be effected.

As even commercial quality alcohols do not, in general, possess impurities which produce discoloration of the esters, any desired alcohol may be used. The alcohols frequently used in making esters include methyl, ethyl, propyl, butyl and amyl alcohols, although others can be used and it is not intended that the invention be limited to those specifically.

As the reducing agent, which is the active color remover in this process, iron, zinc, tin, or any other active metal, that is, a metal having a higher order of activity than hydrogen in the electromotive series and sodium hypophosphite, sodium bisulphite, hydroxylamine hydrochloride, stannous chloride, or similar reducing agents, may be used. Iron filings, turnings, or small pieces of scrap iron are preferred, due to their availability and cheapness. The active metals are preferred over the non-metallic reducing agents as they give a stronger reducing action and remove the color more readily, although sodium hypophosphite has given excellent results.

As will be understood by those skilled in the art, the presence of a small quantity of mineral acid will be necessary to obtain a reducing action. The quantity of acid ordinarily used as a catalyst in the esterification is sufficient for this purpose but the amount may be increased and usually varies between 0.3% to 3.0% of the total kettle charge. Any mineral acid may be used, but since sulfuric acid is the best catalyst for the esterification reaction, it is preferred.

Esters to be acceptable must generally meet the requirement of "water-white", which is defined by the American Society for Testing Materials in the "Tentative Standards for 1928", Serial D, 269 27T, page 350, as follows:

"For a solvent to be rated water-white, the visible color shall not be darker than a solution of 0.0030 g. of potassium bichromate in one liter of water."

In the specific examples given below, numbers are used to designate different degrees of coloration as follows:

| Color number | Grams $K_2Cr_2O_7$ per liter distilled water |
|---|---|
| 0 | 0 |
| 1 | .002 |
| 2 | .004 |
| 3 | .006 |
| 4 | .008 |

Any substance having a color reading of 0 or 1 is well within the specifications of the American Society for Testing Materials for water-white solvents.

To illustrate the present process and to show the results obtained thereby as compared to results obtained by the prior art process hereinabove outlined and which did not include a reducing step, the following specific examples are given. The actual operation of the process in all the specific examples, whether using a reducing agent or not, was substantially the same and comprised charging the kettle with most of the organic acid used, the mineral acid, and the reducing agent, if a reducing agent was used, and then introducing the alcohol mixed with the remainder of the acid, if the acid was not all included in the original kettle charge, into the kettle while it was kept at approximately the boiling point of the reaction liquid. The vapors ascending the fractionating column were condensed and tested for color. All the kettle charges were refluxed for a short time before distilling.

*Example 1.—Preparation of ethyl acetate*

|  | Without reducer | With reducer |
|---|---|---|
| Kettle charge |  |  |
| Acetic acid (64%) | 300 g. | 300 g. |
| Sulfuric acid (conc.) | 3 g. | 3 g. |
| Ethyl alcohol | 350 cc. | 400 cc. |
| Iron (finely divided) |  | 1 gm. |
| Color of distillate |  |  |
| 1st 100 cc. portion | 3 | 0 (W.W.) |
| 2nd 100 cc. portion | 1+ | 0 (W.W.) |
| 3rd 100 cc. portion | 4 | 0 (W.W.) |
| 4th 100 cc. portion | 1— | 1 |

*Example 2.—Preparation of butyl acetate*

|  | Without reducer | With reducer |
|---|---|---|
| Kettle charge |  |  |
| Acetic acid (64%) | 800 g. | 400 g. |
| Butyl alcohol | 600 g. | 300 g. |
| Sulfuric acid (conc.) | 2 cc. | 3 cc. |
| Iron filings |  | 10 gm. |
| Color of distillate |  |  |
| 1st 200 cc. portion | 3+ |  |
| 1st 156 cc. portion |  | 1— |
| 2nd 300 cc. portion | 1+ |  |
| 2nd 142 cc. portion |  | 0 (W.W.) |
| 3rd 110 cc. portion | 3+ |  |
| 3rd 62 cc. portion |  | 2+ |

*Example 3.—Ethyl esters of higher acids*

|  | Without reducer | With reducer |
|---|---|---|
| Kettle charge |  |  |
| *Brown acid | 400 g. | 400 g. |
| Ethyl alcohol | 800 cc. | 800 cc. |
| Sulfuric acid (conc.) | 1 cc. | 2 cc. |
| Iron filings |  | 20 gm. |
| Color of distillate |  |  |
| 1st 100 cc. portion | 4 | 2 |
| 2nd 100 cc. portion | 2 | 1— |
| 3rd 100 cc. portion | 3 | 1— |
| 4th 100 cc. portion | 0+ | 0+ |
| 5th 100 cc. portion | 2 | 1 |
| 6th 100 cc. portion | 0+ | 1— |
| 7th 100 cc. portion | 2 |  |
| 7th 500 cc. portion |  | 1 |
| 8th 100 cc. portion | 1 |  |
| 9th 100 cc. portion | 1 |  |
| 10th 50 cc. portion | Green |  |

* Contains propionic, butyric, valeric, and possibly other acids.

*Example 4.—Ethyl acetate-sodium hypophsphite used as reducer*

| Kettle charge | |
|---|---|
| Acetic acid | 300 g. |
| Sodium hypophosphite | 5 gm. |
| Sulfuric acid (conc.) | 3 gm. |
| Ethyl alcohol | 400 cc. |
| *Color of distillate* | |
| 1st 100 cc. portion | 0 (W.W.) |
| 2nd 100 cc. portion | 0 (W.W.) |
| 3rd 100 cc. portion | 0 (W.W.) |
| 4th 100 cc. portion | 0 (W.W.) |

The above examples illustrate the addition of a reducing agent to the reaction liquid so that the reducing action takes place during the esterification. The results show that while esters having a color value far below specifications for water-white are obtained when the reaction liquid is not subjected to the action of a reducing agent, water-white esters are produced from the same starting materials where the reaction liquid is subjected to the action of a reducing agent. The color of the ester is as good regardless of whether the organic acid, the reaction liquid, or the ester after its separation from the reaction liquid, is subjected to the action of a reducing agent, although it has been found most practical to carry out the reduction during the esterification, or to treat the organic acid while in storage.

As many apparently and widely different embodiments of this invention may be made without departing from the spirit and scope thereof, it is to be understood that we do not limit ourselves to the specific embodiments thereof except as defined in the appended claims.

We claim:

1. In the process of preparing esters of organic acids by reacting an aliphatic monohydroxy alcohol with an aliphatic monocarboxylic acid and distilling off the ester formed from the reaction mixture, the step which comprises subjecting the acid in liquid phase to the action of a reducing agent of sufficient strength to reduce the impurities in the acid without effecting material reduction of the alcohol and acid.

2. In the process of preparing esters of organic acids by reacting an aliphatic monohydroxy alcohol with an aliphatic monocarboxylic acid and distilling off the ester formed from the reaction mixture, the step which comprises subjecting the acid in liquid phase to the action of a reducing agent from the group consisting of active metals, sodium hypophosphite, sodium bisulphite, hydroxylamine hydrochloride and stannous chloride, in the presence of a mineral acid.

3. In the process of preparing esters of organic acids by reacting an aliphatic monohydroxy alcohol with an aliphatic monocarboxylic acid and distilling off the ester formed from the reaction mixture, the step which comprises subjecting the acid in liquid phase to the action of an active metal in the presence of a mineral acid.

4. In the process of preparing esters of organic acids by reacting an aliphatic monohydroxy alcohol with an aliphatic monocarboxylic acid and distilling off the ester formed from the reaction mixture, the step which comprises subjecting the acid in liquid phase to the action of an active metal from the group consisting of iron, zinc, and tin, in the presence of a mineral acid.

5. In the process of preparing esters of organic acids by reacting an aliphatic monohydroxy alcohol with an aliphatic monocarboxylic acid and distilling off the ester formed from the reaction mixture, the step which comprises subjecting the acid in liquid phase to the action of finely divided iron in the presence of sulphuric acid.

6. In the process of preparing esters of organic acids by reacting an aliphatic monohydroxy alcohol with an acid of the lower fatty acid series and distilling off the ester formed from the reaction mixture, the step which comprises subjecting the acid in liquid phase to the action of a reducing agent of sufficient strength to reduce the impurities in the acid without effecting material reduction of the alcohol and acid.

7. In the process of preparing esters of organic acids by reacting an aliphatic monohydroxy alcohol with an acid of the lower fatty acid series and distilling off the ester formed from the reaction mixture, the step which comprises subjecting the acid in liquid phase to the action of a reducing agent from the group consisting of active metals, sodium hypophosphite, sodium bisulphite, hydroxyamine hydrochloride and stannous chloride, in the presence of a mineral acid.

8. In the process of preparing esters of organic acids by reacting an aliphatic monohydroxy alcohol with an acid of the lower fatty acid series and distilling off the ester formed from the reaction mixture, the step which comprises subjecting the acid in liquid phase to the action of an active metal from the group consisting of iron, zinc, and tin, in the presence of a mineral acid.

9. In the process of preparing esters of acetic acid by reacting an aliphatic monohydroxy alcohol and acetic acid and distilling off the ester formed from the reaction mixture, the step which comprises subjecting the acid in liquid phase to the action of a reducing agent of sufficient strength to reduce the impurities in the acid without effecting material reduction of the alcohol and acid.

10. In the process of preparing esters of acetic acid by reacting an aliphatic monohydroxy alcohol and acetic acid and distilling off the ester formed from the reaction mixture, the step which comprises subjecting the acid in liquid phase to the action of a reducing agent from the group consisting of active metals, sodium hypophosphite, sodium bisulphite, hydroxylamine hydrochloride and stannous chloride, in the presence of a mineral acid.

11. In the process of preparing esters of acetic acid by reacting an aliphatic monohydroxy alcohol and acetic acid and distilling off the ester formed from the reaction mixture, the step which comprises subjecting the acid in liquid phase to the action of an active metal from the group consisting of iron, zinc, and tin, in the presence of a mineral acid.

12. Process of preparing esters of organic acids comprising reacting an aliphatic monohydroxy alcohol with an aliphatic monocarboxylic acid in liquid phase in the presence of a catalyst and a reducing agent of sufficient strength to reduce the impurities in the acid without effecting material reduction of the alcohol and acid.

13. Process of preparing esters of organic acids comprising reacting an aliphatic monohydroxy alcohol and an acid of the lower fatty acid series in the liquid phase in the presence of a catalyst and a reducing agent of sufficient strength to reduce the impurities in the acid without effecting material reduction of the alcohol and acid.

14. Process of preparing esters of acetic acid comprising reacting an aliphatic monohydroxy alcohol and acetic acid in the liquid phase in the presence of a catalyst and a reducing agent of sufficient strength to reduce the impurities in the acid without effecting material reduction of the alcohol and acid.

15. Process of preparing esters of organic acids comprising reacting an aliphatic monohydroxy alcohol and an acid of the lower fatty acid series in the liquid phase in the presence of a mineral acid and a reducing agent of sufficient strength to reduce the impurities in the acid without effecting material reduction of the alcohol and acid.

16. Process of preparing esters of organic acids comprising reacting an aliphatic monohydroxy alcohol and acetic acid in the liquid phase in the presence of a mineral acid and an active metal.

17. Process of preparing esters of organic acids comprising reacting an aliphatic monohydroxy alcohol and an acid of the lower fatty acid series in the liquid phase in the presence of a mineral acid and a metal of the group consisting of iron, zinc, and tin.

18. Process of preparing esters of acetic acid comprising reacting an aliphatic monohydroxy alcohol and acetic acid in the liquid phase in the presence of sulphuric acid and an acid reducing agent.

19. Process of preparing esters of acetic acid comprising reacting an aliphatic monohydroxy alcohol having not more than five carbon atoms and acetic acid in the liquid phase in the presence of sulphuric acid and a metal of the group consisting of iron, zinc, and tin.

20. Process of preparing esters of acetic acid comprising reacting an aliphatic monohydroxy alcohol having not more than five carbon atoms and acetic acid in the liquid phase in the presence of sulphuric acid and sodium hypophosphite.

JAMES RAYMOND BUCKLEY.
CARROL ADRON DORAN.